July 13, 1965   J. P. CULLIFER   3,194,575
HARVESTING VEHICLE HAVING WORKER SUPPORT MEANS
Filed Dec. 26, 1963
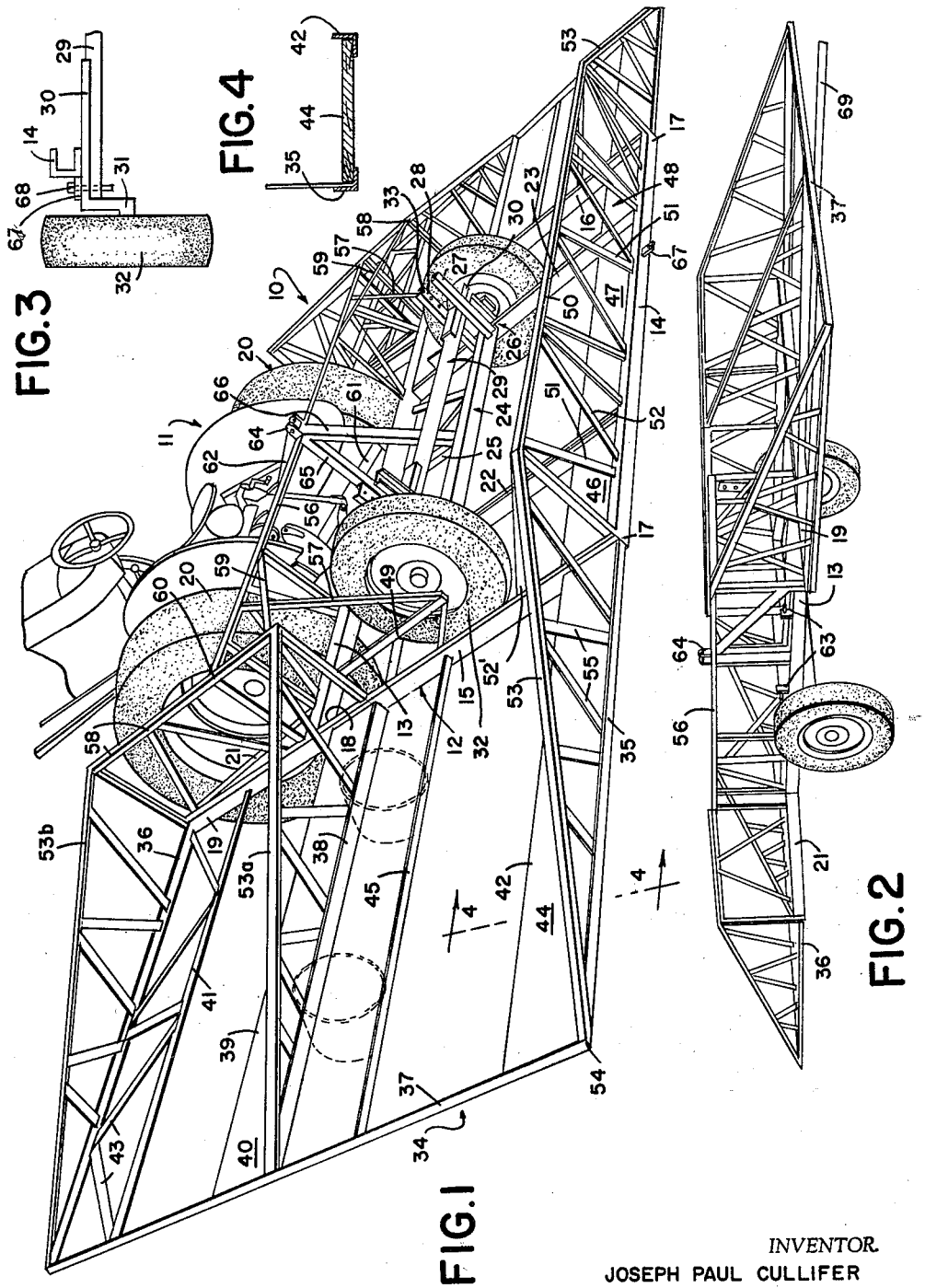
INVENTOR.
JOSEPH PAUL CULLIFER
BY
Aubrey D. McFadyen
ATTORNEY

United States Patent Office 3,194,575
Patented July 13, 1965

3,194,575
HARVESTING VEHICLE HAVING WORKER
SUPPORT MEANS
Joseph Paul Cullifer, Bethel, N.C.
Filed Dec. 26, 1963, Ser. No. 333,381
9 Claims. (Cl. 280—32.5)

This invention comprises improvements in agricultural harvesters, and more specifically it pertains to a wheeled tractor drawn vehicle for transporting a number of workers and their equipment over a planted area while disposed convenient for harvesting or otherwise working the crop. The invention is illustrated herein as especially devised for use in gathering cucumbers, strawberries, and like crops which must be picked from or close to the ground.

The primary object of this invention is to provide apparatus of the kind aforementioned wherein the workers are transported in a seated position close to the ground, with their feet also supported, and their hands free for gathering the crop.

A further object of this invention is to provide apparatus of the kind aforementioned including an elongate chassis adapted to span several planted rows, and having seats thereon for the workers, a wheeled structure normally supporting said chassis to be moved over a planted area, and means for adjusting the entire chassis vertically relative to said wheeled structure to regulate the distance of said seats above the ground.

A further important object of this invention is to provide apparatus of the kind aforementioned including a chassis and a wheeled supporting structure therefor including means whereby said wheeled structure may be shifted 90 degrees from harvesting position to a transport or road position.

A still further object of this invention is to provide in an apparatus of the kind aforementioned an elongate chassis having cantilever extensions or wings at either end for carrying workers, one side of said chassis being recessed to accommodate the wheels of a farm tractor, and said recessed portion of the chassis being provided with means for establishing a three-point connection to said tractor.

Yet another object of this invention is to provide in an apparatus of the kind aforementioned a worker transporting structure of sufficient rigidity that it may be lifted bodily by said tractor through said three-point connection to facilitate shifting of said wheel structure for harvesting to transport position.

A further object of this invention is to provide in an apparatus of the kind aforementioned a chassis built around a single straight primary beam, with the worker supporting means supporting means substantially balanced on either side and at opposite ends of said beam.

The foregoing, together with other ancillary objects of the invention which will later become apparent, are obtained by the present apparatus, a preferred embodiment of which has been illustrated, by way of example, in the accompanying drawings, wherein:

FIG. 1 is a perspective looking toward the left rear corner of my apparatus, showing same connected to a farm tractor for use in harvesting;

FIG. 2 is a perspective looking toward the right front corner of my apparatus, showing same set up for transport;

FIG. 3 is a fragmentary detail of one end of the axle and its wheel in the transport set-up of FIG. 2; and FIG. 4 is a cross-sectional detail of a mode of mounting the seat boards for the pickers taken along section line 4—4 of FIG. 1.

Referring now more specifically to the accompanying drawings, wherein like reference numerals designate corresponding parts throughout the several views, and for the moment considering FIG. 1, reference numeral 10 designates the apparatus of the present invention broadly and 11 is a conventional type farm tractor connected thereto for towing same by devices standard on such tractors.

My apparatus includes a rigid chassis 12 including a front main beam 13, a secondary rear beam 14 of the same length as the main beam and disposed in parallel spaced relation thereto; and end beams 15, 16 each connected at one end 17 to the secondary beam and each connected at an intermediate point 18 to the main beam, with the end portion 19 of each projecting therebeyond to receive the wheels 20 of said tractor therebetween. Each end portion 19 is reinforced by a brace rod 21, fixed at one end to the main beam adjacent an end thereof and extending obliquely and fixed to its respective projecting end portion. Within the rectangular frame thus defined there is a system of axle supporting members including parallel beams 22, 23 spaced on the order of two feet from the adjacent end beams 15, 16. The ends of beams 22, 23 are secured to the main and secondary beams 13, 14, respectively. A center beam 24 is disposed beneath and parallel to axle 29 and connects medial points of beam 22 and 23. A stub beam 25 connects the medial portions of the main and the center beam 24 of the axle support. In practice I form the connections between all the elements of the chassis just described by welding; but it is to be understood that rivets, bolts and the like may be feasible for many of the connections. This obtains for all the structure comprising my apparatus.

The strength of the several beams of the chassis will vary depending upon the number of rows of plants the apparatus is to span, and the number of workers or pickers to be carried thereon. Where the apparatus is to span six to eight rows of plants and carry eight workers I recommend that main beam 13 and axle beam 24 be in the form of tubes comprised of two pieces of 3" x 1¼" channel iron welded together; while the remaining components of the chassis may be formed of 3" x 1⅜" channel iron. The reason for the extra strength in main beam 13 is that the tractor lever arms are connected directly thereto, and this connection is such that the entire apparatus may be raised bodily by the tractor during turning at the end of a row, as well as for shifting the wheels to convert the apparatus for transport, as will subsequently be described.

At each end of the center beam 24 of the axle supporting system, I provide an upstanding guide 26. Each guide consists of two parallel upstanding stub channel irons 27, 28 secured respectively to the opposite side walls of beam 24 and receive an axle 29 therebetween. Axle 29 preferably is tubular and at the point where it passes through guides 27, 28 a short section of channel iron 30 is welded thereto to prevent rotation of the axle in said guides. As shown in FIG. 3, each end of the axle is formed with a downwardly directed arm 31, each terminating in a horizontal spindle for one of the wheels 32. Wheels 32 are of the automobile type and for harvesting they are positioned adjacent the inner beams 22, 23, within the space between said beams and end beams 15, 16. The channel irons defining guides 26 are formed with a series of vertically spaced aligned holes 33 for bolts, and a pair of bolts pass through certain of the holes, one above and the other below axle 29, for restraining the axle against vertical movement, while engagement of the lower bolts with the downwardly extending arms 31 prevents endwise movement of the axle. From the foregoing, and the fact that the axle is normally above the chassis, it should be clear that as the position of the axle is adjusted upwardly in guides 26, the chassis is correspondingly lowered.

Projecting from each end of chassis 12 is a rectangular extension or wing structure 34, and since these structures, together with the mechanical supporting systems therefor, are identical, reference numerals have been applied, in the main, only to the proximate wing structure and supporting means therefor. Each wing structure is comprised of parallel front and rear 1" angle irons 35, 36, secured to the respective ends of end beam 15, with a like angle iron 37 connecting the free ends of said pair of angle irons 35, 36, thus defining a rectangular frame. At the center of each wing there are a pair of parallel angle irons 38, 39 extending between end beams 15 and the angle iron 37, with the horizontal walls thereof opposed similar to the angle bars shown in FIG. 4, providing a support for a seat in the form of a board 40, as well as reinforcing the wing. Corresponding parallel angle irons 41, 42 are disposed on the order of 14" from the front and rear angle irons 35, 36 and may be tied respectively to the latter by a series of flat metal straps 43 to add rigidity to the wing. A seat in the form of a board 44 rests upon the rear angle irons 35, 42, while the angle irons 36, 41 provide a support for baskets to receive the vegetables as gathered by the pickers assigned to seat 40. The pickers assigned to the front seat 40 may employ the space on angle iron 41 between the baskets as a foot rest. A special foot rod 45 is provided for pickers assigned to rear seat 44, and baskets for the latter pickers may be supported jointly by being wedged between said rod 45 and the adjoining angle iron of seat 40. It should be noted that there are seat boards 46, 47, 48 supported on the chassis adjacent the secondary beam thereof, and the latter seat boards are in alignment with the rear seats of the wing structure. The pickers assigned to seat 47 use axle beam 24 as a foot rest, and the baskets (not shown) for the pickers assigned to seat 47 are located on the other side of the axle beam, but in clear view of the pickers. It should also be noted that a basket support 49 is provided within the confines of the chassis adjacent each wheel 32 for the pickers assigned to seats 46, 48, and support 49 also serves as a foot rest.

To sustain the wing structures, add rigidity to the entire apparatus, and furnish a back rest for the pickers, I provide the superstructure shown and which will now be described. First, I provide a 1" angle iron 50 of the length of secondary beam 14 and mount this securely above said beam through a series of posts 51 and brace straps 52, comprising a truss-work interconnecting said angle iron and beam. A brace rod 52' is connected at one end to angle iron 50 and at the other end to beam 15. At each end of angle iron 50 there is a like size angle iron 53 which is inclined downwardly and is connected at its outer end to the end portion 54 of angle iron 37 of the wing. A series of straps 55 interconnect rear angle iron 35 and inclined angle iron 53, in the fashion of a cantilever. Thus, for rear portion of the wing to sag under load, would require that one of the angle irons 50, 53 must break, or that the connections of the posts 51 and/or straps 52 tear loose.

Above the front main beam 13 is also securely fixed a 1" angle iron 56 in the same manner as just described for the secondary beam 14. A brace rod 57 is fixed at one end to each basket supported structure 49 and extends obliquely upward and is connected to angle iron 56. A like size angle iron 58 is similarly positioned above and extends from the projecting end 19 of each end beam 15, 16 to the point at which angle iron 38 is joined thereto. Angle iron 58 is connected to end beam 15 in the same manner as angle irons 50 and 56 are connected to the chassis, and there is a strap 59 connecting its inner end to a medial portion of angle iron 56. Angle iron 58 is joined at 60 to angle iron 56. From each end of angle iron 58 a cantilever structure 53a, 53b substantially like that shown and described for the ends of angle iron 50 is provided, thus establishing a rigid connection with the outer angle iron 37 of the wings.

As alluded to above, farm tractors include a pair of lever arms for connection to gang plows, harrows, and the like, and these lever arms are hydraulically operable for lifting said apparatus from the ground during turning of the tractor at the end of a row. One of said lever arms 61 appears in FIG. 1, the other being blocked from view by the tire of the tractor. A stabilizing link 62 between the tractor and such apparatus retains the latter horizontal when being lifted. Since my apparatus is to be used in conjunction with the aforementioned type of tractor, my appaartus includes some special adaptations. First, on front main beam 13 I secure a pair of spaced connectors 63 (FIG. 2) for pivotally engaging the ends of said lever arms. Second, I provide a U-shaped pivotal connector 64 at substantially the center of angle iron 56 for pivotal connection with the stabilizing link 62 of the tractor. To take care of the stresses thus involved, a bolt passes through the bight of connector 64, through an opening in angle iron 56, and into post 65, which latter, in turn, is secured to the main beam 13. A rugged brace member 66 is welded at one end to the upper portion of post 65 and similarly fixed at its lower end to the juncture of stub beam 25 and the axle supporting beam 24. In the arrangement herein described the present apparatus may be lifted bodily by the tractor in any necessary or desirable situation.

One such situation is in connection with shifting the axle 29 and its wheels from the harvesting position of FIG. 1 to the transport or road position of FIG. 3. The space between inner beams 22, 23 is purposely substantially the same as the space between the main beam 13 and secondary beam 14, so that axle 29 and its wheels may be removed from the position of FIG. 1, above the chassis, to the position of FIG. 2, beneath the chassis. Accordingly, the front and rear beams are each provided with a fixed laterally projecting lug 67 (FIGS. 1 and 3) each formed with a bolt opening, and the ends of axle 29 are formed with bolt openings to register with the openings in said lugs. To make the conversion, the upper bolts are removed from guides 26 and the axle and its wheels may thereupon be lifted from the apparatus, the tractor, through said lever arms meanwhile holding the chassis in fixed position. With the axle removed, the lever arms are activated to raise the chassis sufficiently that the axle and wheels may be rolled into place beneath the chassis. When the axle is in place the chassis similary may be lowered as slowly as desired while effecting registration of the holes in said lugs and the axle, whereupon bolts 68 may be applied and tightened. A detachable tongue 69 is next bolted to the underside of one end of the apparatus, and upon connection of the tongue to the tractor or other vehicle, the apparatus is ready for transport.

In my apparatus, in picking cucumbers, for example, with the several pickers seated, the apparatus is drawn by the tractor over the area to be harvested. The wheels 32 of my apparatus track with the wheels of the tractor, and thus straddle one row and consequently they do not run over and damage any of the crop. The open space within the confines of the apparatus enables the picker to readily spot the cucumbers, and same may be picked while the worker is in an upright seated position.

Numerous modifications will readily occur to those skilled in the art after consideration of the foregoing specification and the accompanying drawings, and it is therefore not intended to limit the present invention to the exact construction shown and described, but all suitable modifications and equivalents may be resorted to which fall within the scope of the appended claims.

I claim:

1. Apparatus of the kind described comprising an elongate rectilinear open chassis comprised of a main front beam and a secondary rear beam, end beams each connected at one end to said secondary beam and each connected at an intermediate point to said primary beam with its end portion projecting therebeyond to receive the wheels of a farm tractor therebetween, seats for workers disposed along said secondary beam, a pair of spaced, upstanding axle guides fixed to said chassis, each of said guides comprising spaced vertical guide elements, the elements of said guides being formed with aligned holes for receiving bolts therein, an axle having noncircular end portions received between the elements of said guides and restrained from vertical movement by bolts passing through the openings in said guide elements above and below said noncircular portions, the ends of said axle beyond said guides being formed with downwardly extending arms each terminating in a horizontal outwardly extending spindle, a wheel mounted on each of said spindles, a pair of spaced hitch devices fixed to said primary beam for connection to the power operated towing levers of said tractor, and a third hitch device fixedly mounted on said primary beam at a point intermediate and above said pair of hitches for connection to the stabilizing link of said tractor.

2. The apparatus as defined in claim 1 wherein said front and rear beams define the length of said chassis and said end beams define the width thereof, said elongate rectilinear chassis including a pair of inner parallel beams extending between said front and rear beams and being spaced apart a distance substantially equal to the width of said chassis, a center beam connecting the medial portions of said inner beams, said guides being mounted on the end portions of said center beam, said axle disposed above said chassis and having its end portions positioned in said guides and carrying a wheel at each end positioned between said end beams and said inner beams for supporting said chassis, and means for securing said axle in selected vertical adjustment in said guides.

3. The apparatus as defined in claim 2 wherein the medial portion of both the front and rear beams are provided with outwardly extending means for anchorage of opposite end portions of said axle thereto when removed from said guides for conversion to road transport status.

4. The apparatus as defined in claim 2 further including a stub beam connecting the medial portions of said main beam and center beam, a post securely fixed centrally of said main beam and terminating with a hitch device for connection with the stabilizer link of said tractor, and a brace beam extending between the upper end of said post and the juncture of said stub beam with said center beam.

5. The apparatus of the kind described, a chassis including an axle having a wheel at each end thereof, whereby said chassis may be drawn over a planted area, said chassis including a main beam and a secondary beam of equal length disposed in spaced parallel relation thereto, end beams each connected at one end to said secondary beam and at an intermediate point to an end of said main beam, with its other end projecting forwardly beyond said main beam for receiving the wheels of a tractor therebetween a pair of wing structures, each wing structure extending along substantially the length of and fixed respectively to one of said end beams and projecting outwardly therefrom in opposite directions, a pair of brace members each being connected at one end to the projecting end of one of said end beams and extending at an acute angle therefrom and connected to said main beam, said main beam between said projecting portions carrying means for establishing a three-point connection to said tractor, and said chassis and wing structures being provided with seats for the pickers and supports within easy reach for their baskets.

6. The apparatus as defined in claim 5 wherein said chassis is formed with upstanding guides, and said axle is vertically adjustable therein, whereby said chassis may be bodily adjusted toward or from the ground.

7. Apparatus of the kind described comprising an elongate rectilinear open chassis comprised of a main front beam and a secondary rear beam, end beams each connected at one end to said secondary beam and each connected at an intermediate point to said primary beam with its other end portion projecting forwardly to receive the wheels of a farm tractor therebetween, a pair of brace rods for said projecting end portions, each being fixed at one end to said main beam adjacent an end thereof and extending obliquely and fixed to its respective projecting end portion, a pair of axle guides fixed to said chassis, each of said guides comprising spaced vertical guide elements extending above said chassis for supporting said chassis in selected vertical adjustment, an axle having noncircular end portions received between the elements of said guides and restrained in vertical adjustment in said guides, the ends of said axle beyond said guides being formed with downwardly extending arms each terminating in a horizontal outwardly extending spindle, a wheel mounted on each of said spindles, a pair of spaced hitch devices fixed to said primary beam for connection to the power operated towing levers of said tractor, and a third hitch device fixedly mounted on said primary beam at a point intermediate and above said pair hitches for connection to the stabilizing link of said tractor.

8. The apparatus as defined in claim 7 further including a rectilinear wing structure projecting outwardly from each of said end beams, the peripheray of each wing structure being defined by parallel front and rear angle irons in alignment with said main and secondary beams, respectively, and an outer angle iron connecting the free ends of said pair of irons, parallel front and rear seats extending across each wing, and a cantilever system supporting each wing.

9. The apparatus as defined in claim 8 wherein said cantilever system includes a truss structure disposed above and fixed to said main beam and a like structure on said secondary beam, a rod connected at one end to an end of the truss structure on said secondary beam and extending at an incline and secured to said outer angle iron, a like third truss structure secured upon each end beam of said chassis and extending from the projecting end portion thereof to substantially the center portion thereof, the truss structures of said main and end beams being joined at their point of intersection, and an inclined rod connected to each end of said third truss structure and at the opposite end to said outer angle iron.

References Cited by the Examiner

UNITED STATES PATENTS

| | | |
|---|---|---|
| 2,590,965 | 4/52 | Huston. |
| 2,736,567 | 2/56 | McMurray _____ 280—43 X |
| 2,799,234 | 7/57 | Chancey. |
| 2,990,195 | 6/61 | Everett et al. _____ 280—413 X |
| 3,086,789 | 4/63 | Kleiman _____ 280—43 |

FOREIGN PATENTS

| | | |
|---|---|---|
| 518,390 | 3/53 | Belgium. |
| 906,256 | 9/62 | Great Britain. |
| 334,526 | 12/63 | Switzerland. |

BENJAMIN HERSH, *Primary Examiner.*

KENNETH H. BETTS, A. HARRY LEVY, *Examiners.*